Figure 1:
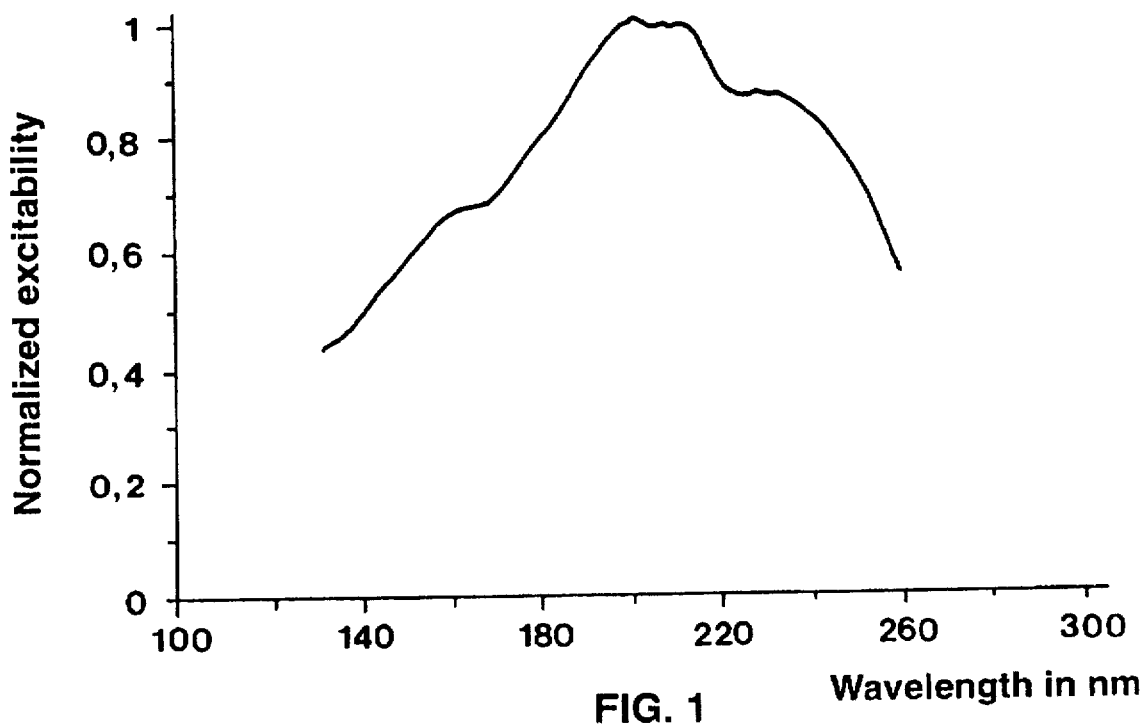

United States Patent [19]

Zachau et al.

[11] Patent Number: 5,714,835
[45] Date of Patent: Feb. 3, 1998

[54] XENON EXCIMER RADIATION SOURCE WITH FLUORESCENT MATERIALS

[75] Inventors: Martin Zachau, Geltendorf; Dieter Schmidt; Ulrich Muller, both of Munich, all of Germany

[73] Assignee: Patent-Treuhand-Gesellschaft F. Elektrische Gluehlampen mbH, Munich, Germany

[21] Appl. No.: 525,757

[22] PCT Filed: Apr. 5, 1994

[86] PCT No.: PCT/DE94/00382

§ 371 Date: Sep. 25, 1995

§ 102(e) Date: Sep. 25, 1995

[87] PCT Pub. No.: WO94/22975

PCT Pub. Date: Oct. 13, 1994

[30] Foreign Application Priority Data

Apr. 5, 1993 [DE] Germany ............... 43 11 197.1

[51] Int. Cl.$^6$ ............... H01J 1/62; C09K 11/08
[52] U.S. Cl. ............... 313/486; 313/637; 252/301.4 R; 252/301.4 P
[58] Field of Search ............... 313/484, 485, 313/486, 487, 496, 637, 643, 635, 489; 252/301.4 P, 301.4 R

[56] References Cited

U.S. PATENT DOCUMENTS

| | | | |
|---|---|---|---|
| 4,161,457 | 7/1979 | Takahashi et al. | 252/301.4 R |
| 4,423,349 | 12/1983 | Nakajima et al. | 313/487 |
| 4,473,518 | 9/1984 | Minagawa | 252/301.4 R |
| 4,983,881 | 1/1991 | Eliasson et al. | 313/635 |
| 5,047,173 | 9/1991 | Kasenga et al. | 252/301.4 R |
| 5,132,043 | 7/1992 | Deboer | 252/301.4 R |

FOREIGN PATENT DOCUMENTS

| | | | |
|---|---|---|---|
| 0 062 993 A1 | 10/1982 | European Pat. Off. | H01J 29/70 |
| 0 331 738 A1 | 9/1989 | European Pat. Off. | C09K 11/81 |
| 0 498 689 A1 | 8/1992 | European Pat. Off. | C09K 11/81 |
| 52-133 091 | 11/1977 | Japan. | |
| 59-015 951 | 4/1984 | Japan. | |
| 2-135 277 | 5/1990 | Japan. | |
| 1022399 | 3/1966 | United Kingdom. | |

OTHER PUBLICATIONS

Journal of the Optical Society of America, "Luminosity and Color-Rendering Capability of White Light"; vol. 61, No. 9; pp. 1155 through 1163; Sep. 1971.
Charles Kittel's "Introduction to Solid State Physics", Sixth Edition, preface pages and pp. 359 through 363.
Journal of Applied Physics, V 29 No. 3, 14 Mar. '96, Summerer "Model of a Weakly Ionized, Low-Pressure Xenon DC Positive Column Discharge Plasma".

*Primary Examiner*—Michael Horabik
*Assistant Examiner*—Michael Day
*Attorney, Agent, or Firm*—Frishauf, Holtz, Goodman, Langer & Chick, P.C.

[57] ABSTRACT

A xenon excimer ($Xe_2$) radiation source for producing vacuum ultraviolet (VUV), broad-band, molecular radiation of wavelengths shorter than 200 nm includes fluorescent materials for excitation by the VUV radiation and illumination purposes. The fluorescent materials include a mixed borate with the general formula: $(Y_xGd_yEu_z)BO_3$; a mixed aluminate with the general formula: $(B_aEu_y)MgAl_{10}O_{17}$; a mixed aluminate with the general formula: $(Y_xGd_yEu_z)_3Al_5O_{12}$; a mixed silicate with the general formula: $(Y_xSc_yTb_z)_2SiO_5$; a mixed borate with the general formula: $(Y_xGd_yTb_z)BO_3$; and a mixed phosphate with the general formula: $(Ln_xCe_ySc_wTb_z)PO_3$. In an alternate embodiment, a fluorescent lamp includes a xenon excimer radiation source for producing vacuum ultraviolet (VUV) radiation, and fluorescent materials for excitation by the VUV radiation and illumination purposes, wherein the fluorescent materials includes a red fluorescent material of a mixed borate with the general formula: $(Y_xGd_yEu_z)BO_3$; a green fluorescent material of a mixed phosphate with the general formula: $(Ln_xCe_ySc_wTb_z)PO_3$ wherein Ln is either La, Y, or Gd; and a blue fluorescent material of a mixed aluminate with the general formula: $(Ba_xEu_y)MgAl_{10}O_{17}$.

13 Claims, 5 Drawing Sheets

XENON EXCIMER RADIATION SOURCE WITH FLUORESCENT MATERIALS

FIELD OF THE INVENTION

The invention relates to fluorescent materials excitable by VUV (Vacuum Ultra Violet) radiation, and fluorescent lamps coated with them.

The present invention is related closely to German Patent Application P 43 11 197.1, to which International Application PCT/DE94/00380, published as WO94/23442, and United States National application Ser. No. 08/491,872, issued as U.S. Pat. No. 5,604,410 VOLLKOMER et al., correspond, in which a novel mode of operation for dielectrically impaired discharges is disclosed. The teaching provided in detail therein enables among others a markedly more efficient generation of UV and VUV radiation, especially by means of excimers—such as $Xe_2^*$, which emits a molecular band radiation in the range around 172 nm—than was possible previously. Hereinafter, the term VUV radiation will be used to mean particularly electromagnetic radiation at wavelengths in the range between about 145 nm and 185 nm.

BACKGROUND

The primary field of application of modern fluorescent materials in lighting technology, or in other words for converting short-wave electromagnetic radiation into light, is the fluorescent lamp. Such a lamp is based on mercury low-pressure discharge, which outputs energy predominantly in the form of UV radiation. Essentially, this is radiation of an atomic spectral line with a wavelength of about 254 nm.

To meet the increasing demand for environmental awareness, mercury-free UV and VUV radiation sources have increasingly been developed recently. Until now, however, it was possible to attain only relatively low UV and VUV yields (approximately 10% to 20%, at industrially relevant power densities), by comparison with mercury low-pressure discharge (approximately 70%). It was therefore uneconomical to use this mercury-free UV or VUV radiator in an embodiment as a fluorescent lamp for general lighting, and such a use was therefore not considered. Accordingly there was also no need to search for fluorescent materials that are both readily excited in the VUV range and suitable in terms of their emission properties for purposes of general lighting. With the mode of operation described in the aforementioned patent application, it is possible for the first time to attain efficiencies of 65% and more in mercury-free discharges, particularly for generating VUV radiation. The high VUV yields are due in particular to the highly efficient generation of $Xe_2^*$ excimers. The radiation emitted is predominantly in the wavelength range between approximately 145 nm and 185 nm. A genuine alternative to conventional mercury low-pressure discharge has thus been found with a view to efficient radiation generation. However, if the novel radiation source is to be used in general lighting, then the conversion of the short-wave VUV radiation into light, that is, into the visible range of the optical spectrum, must be done.

THE INVENTION

The object of the invention is to provide fluorescent materials that luminesce efficiently in the visible range of the optical spectrum when irradiated with VUV radiation, especially at wavelengths in the range between approximately 145 nm and 185 nm.

A further object of the invention is to provide a fluorescent lamp with a fluorescent material coating suitable for purposes of general lighting, the lamp being based on a VUV radiator that in particular generates wavelengths in the range between approximately 145 nm and 185 nm.

One characteristic variable for the efficiency of the conversion of electromagnetic radiation by fluorescent materials is its wavelength-dependent excitability. This is proportional to the product of the absorption and the quantum efficiency. The latter is the likelihood of the generation of a photon by the fluorescent material after a photon of relatively short wavelengths (relatively high energy) has been absorbed. Maximum excitability accordingly is present if both the absorption and the quantum efficiency are 100%, or in other words every incident photon is absorbed and converted into a photon of longer wavelengths (lower energy).

In preliminary tests, the excitability with VUV radiation of a number of typical fluorescent materials for use in conventional fluorescent lamps with mercury low-pressure discharge has been purposefully ascertained by measurement technology. It has been found that in all the fluorescent materials, with decreasing wavelength of the incident radiation, although the absorption essentially increases, nevertheless the excitability unexpectedly decreases drastically when it drops below a limit wavelength. This behavior is shown as an example in FIGS. 1–3. These figures show the standardized excitability as the function of the wavelength of one fluorescent material each for the colors red ($Y_2O_3:Eu^{3+}$), green ($GdMgB_5O_{10}:Ce, Tb$) and blue ($BaMgAl_{10}O_{17}:Eu$). As a consequence, some fluorescent materials, which are advantageously used in conventional fluorescent lamps, such as the green fluorescent material $CeMgAl_{11}O_{19}:Tb^{3+}$, exhibit inadequate excitability by VUV radiation. In that case, the drop in excitability already extends over the entire VUV range. Other fluorescent materials, contrarily, can be better excited by VUV radiation, since the drop does not occur until at the short-wave end of the VUV range. One example of this is the blue fluorescent material $BaMgAl_{10}O_{17}:Eu^{2+}$, which is likewise known (see FIG. 3).

The physical processes on which the observed behavior is based are not yet entirely understood. It is currently assumed that possible causes are based on fundamentally different absorption mechanisms for radiation at wavelengths below the limit wavelength. The radiation power of the spectral line that is most important for fluorescent material excitation in the conventional mercury low-pressure discharge, at wavelengths 254 nm, leads primarily to an excitation of the activator atoms, or coactivators (sensitizers) that are possibly present, which also act as loci of luminescence. The sensitizers in this case transfer the excitation energy to the activator atoms. Below the limit wavelength, the absorption through the host lattice increases abruptly (the absorption coefficient attains values on the order of magnitude of $10^5 cm^{-1}$ and more). The limit wavelength can therefore be interpreted in simplified terms as the maximum wavelength that a photon can have if it is to be just able to excite an electron from the valence band of the host lattice into the conduction band. The attendant energy difference between the valence and conduction bands will hereinafter be called the optical band gap, while the limit wavelength will be called the optical band edge.

If an electron of the host lattice is excited from the valence band into the conduction band, by absorbing one photon of corresponding energy, the result is an "electron-hole pair," in which the electron and the hole can be free or bound in the form of an exciton. (Details may be found for instance in:

Charles Kittel, *Einführung in die Festkörper Physik* [Introduction to Solid-State Physics], Oldenbourg Verlag, Munich, 5th Edition, 1980, pp. 359 ff.) An exciton is electrically neutral and can therefore move relatively freely within the lattice and give up its energy to its collision partner, such as an activator atom. The latter can in turn radiate energy in the form of light. For increasing photon energies (decreasing wavelengths of the radiation absorbed), a pronounced decrease in excitability has been ascertained experimentally as soon as the photon energies are greater than the optical band gap (that is, the wavelengths of the photons are lower than the optical band edge). Although there is no intent to adhere to any particular theoretical explanation, currently both surface and volume imperfections are considered to be responsible for this observation. The imperfections increasingly "catch" the free electrons and holes or excitons before the latter can give up their energy to the activator atoms (that is, the loci of luminescence). From the imperfections—which can be contamination, misalignments, or the like—the energy passes without radiation into various loss channels and in the final analysis produces nothing but undesired heating of the fluorescent material.

Briefly, according to the invention those fluorescent materials for lighting purposes are provided that can be efficiently excited with VUV radiation. Based on the discoveries described above, this means fluorescent materials whose optical band gap in the host lattice is above the low-energy limit of the energy spectrum of the VUV radiation, and in particular above 6.7 eV. Suitable host lattices include borates, phosphates, aluminates and silicates, for instance. The host lattice is doped with at least one additional substance, which functions as a locus of luminescence and is conventionally called an activator. By a suitable choice of the activator, the optical spectrum of the luminescence can be influenced in a targeted way. The color of the luminescence is used to designate the applicable fluorescent material. The three fundamental colors red, green and blue are of predominant interest for lighting technology, because with them virtually any arbitrary mixed color can be produced, for instance for effect or signal lighting, as well as white light—which is especially important for general lighting. To that end, the most various fluorescent material components are combined with one another, for instance being mixed or arranged in alternating succession. Suitable activators include, for instance, $Eu^{3+}$ for red fluorescent materials or illuminants, $Tb^{3+}$ for green illuminants, and $Eu^{2+}$ for blue illuminants. Fluorescent materials whose emission spectra are especially highly suitable for a three-band fluorescent material can thus be purposefully activated. To optimize both the light yield and the color reproduction of a three-band lamp for general lighting, the main emission of the red illuminant must be at approximately 610 nm, of the green illuminant at approximately 540 nm, and of the blue illuminant at approximately 450 nm (see, for example, A. W. Thornton, J. Opt. Soc. Am. 61 (1971) 1155).

In the further feature, one or more further dopant substances are added to the host lattice. Once again these are activators, or in other words loci of luminescence. In this way it is possible with only a single fluorescent material to attain fundamentally arbitrary mixed colors by a suitable choice of the various activators. For instance, yellow light is produced from a fluorescent material with one green- and one red-luminescing activator. For white light, at least one third, blue-luminescing activator is additionally necessary.

Depending on the location of their optical band edge within the VUV range of interest here, the VUV fluorescent materials or illuminants according to the invention—that is, those that are efficiently excitable—can be roughly assigned to two classes. In the first class, more than 50% of the incident VUV radiation output is absorbed by the host lattice and from there is transferred to the loci of luminescence. The remaining proportion of the VUV radiation output can be absorbed directly by the activator atoms, for instance. One example of this is the red fluorescent material $(Y_xGd_yEu_z)BO_3$. This is a mixed borate activated with trivalent europium $Eu^{3+}$. Suitable values for x, y and z are $0 \leq x \leq 0.99$, $0 \leq y \leq 0.99$, $0.01 \leq z \leq 0.2$, with preferred values being $0.55 \leq x \leq 0.87$, $0.1 \leq y \leq 0.3$ and $0.03 \leq z \leq 0.15$, where in each case the peripheral condition $x+y+z \approx 1$ is met. One example of a blue fluorescent material is the mixed aluminate $(Ba_xEu_y)MgAl_{10}O_{17}$ activated with divalent europium $Eu^{2+}$. Suitable values for x and y are $0.6 \leq x \leq 0.97$, $0.03 \leq y \leq 0.4$, and preferably $0.8 \leq x \leq 0.95$, $0.05 \leq y \leq 0.2$, where in each case $x+y \approx 1$. Examples of green fluorescent materials activated with trivalent terbium $Tb^{3+}$ are: 1.) the mixed aluminate $(Y_xGd_yTb_z)_3Al_5O_{12}$, where the following are true: $0.1 \leq x \leq 0.99$, $0 \leq y \leq 0.9$, $0.03 \leq z \leq 0.4$ and $x+y+z \approx 1$, and in particular y=0, $0.8 \leq x \leq 0.99$, $0.01 \leq z \leq 0.2$ and $x+z \approx 1$; 2.) the mixed silicate $(Y_xSc_yTb_z)_2SiO_5$, where the following are true: $0.6 \leq x \leq 0.99$, $0 \leq y \leq 0.1$, $0.01 \leq z \leq 0.4$ and $x+y+z \approx 1$; and 3.) the mixed borate $(Y_xGd_yTb_z)BO_3$, where the following are true: $0 \leq x \leq 0.99$, $\leq y \leq 0.99$, $0.01 \leq z \leq 0.4$, preferably $0.55 \leq x \leq 0.8$, $0.1 \leq y \leq 0.3$, $0.03 \leq z \leq 0.2$ and $x+y+z \approx 1$. The closer the optical band edge is to the upper limit of the VUV wavelength range, the more the absorption of the VUV radiation by the host lattice dominates. In an extreme case, there is nothing but host lattice absorption; that is, with and without activators the same absorption is attained.

In the second class, conversely, more than 50% of the incident VUV radiation output is absorbed directly by the activator (that is, the locus of luminescence). The remaining portion of the VUV radiation output can be absorbed for instance by the host lattice and possible further dopant substances. This situation pertains if the optical band edge of the host lattice is markedly lower than the upper limit of the VUV wavelength range. Examples for this class of fluorescent materials are mixed phosphates, activated with trivalent terbium $Tb^{3+}$, corresponding to the general formula $(Ln_xCe_ySC_wTb_z)PO_4$, where Ln is one of the elements lanthanum La, yttrium Y or gadolinium Gd or a mixture of these elements. Suitable values for x, y, w and z are $0.35 \leq x \leq 0.95$, $0 \leq y \leq 0.5$, $0 \leq w \leq 0.2$ $0.05 \leq z \leq 0.5$, and preferably w=0, $0.45 \leq x \leq 0.8$, $0.1 \leq y \leq 0.3$, $0.1 \leq z \leq 0.25$, where in each case $w+x+y+z \approx 1$. In these cases, the excitation output is absorbed almost exclusively by the activator $Tb^{3+}$ itself. The $Ce^{3+}$ required as a sensitizer in excitation with radiation at the wavelength 254 nm is in the present case of VUV excitation for the fluorescent materials of this class of secondary importance and can possibly be omitted, without resulting in any change in the light yield. Whether in this connection $Ce^{3+}$ brings about any improvement at all (however slight) has not yet been conclusively determined.

In a preferred embodiment, one or more of the fluorescent materials described are processed to make a fluorescent material coating. The choice of fluorescent materials is done such that VUV radiation is converted into especially suitable spectral ranges. To that end, the fluorescent material coating is advantageously applied to the inside wall surface of a lamp bulb, and inside the lamp bulb VUV radiation is generated, especially at wavelengths in the range between about 145 nm and 185 nm. This short-wave radiation is already strongly absorbed in air and in most lamp vessel materials, which is why coating on the outer wall would demand special and hence expensive VUV-transparent materials—such as special quartz glasses like SUPRASIL® (made by Heraeus). Moreover, in that case the lamp would have to have an additional outer bulb for protection against being touched.

In an especially preferred embodiment, a three-band fluorescent material coating is used to generate white light. It comprises the following fluorescent materials according to the invention: a red component R, in particular (Y, Gd)BO$_3$:Eu$^{3+}$, a green component G, in particular LaPO$_4$:(Tb$^{3+}$, Ce$^{3+}$), and a blue component B, in particular BaMgAl$_{10}$O$_{17}$:Eu$^{2+}$; for the proportions by weight in the mixture, the following relations apply: 0.2<R <0.5, 0.4<G<0.7, 0.05<B<0.15, and R+G+B=1. The fluorescent material coating is distinguished not only good VUV excitability but also by good color reproduction, which is of major importance especially in lighting technology. Moreover it can be advantageous to provide the surface of the fluorescent materials, that is, of the individual granules of fluorescent material and/or of the applied fluorescent material coating, with a protective layer, for instance of MgF$_2$, that is adequately transparent in the VUV range.

The invention is described in further detail below in terms of several exemplary embodiments. First, some lighting engineering data of fluorescent materials is provided, ascertained from excitation with Xe$_2$* excimer radiation. The variable E$_{Xe}$ indicates how high the excitability with VUV radiation (by means weighted with the spectrum of Xe$_2$* excimer radiation in the wavelength range between 145 nm and 185 nm) relative to the maximum excitability that is attained for a certain discrete wavelength. E$_{Xe}$ is thus the value to which the excitability of a fluorescent material decreases if it is irradiated not with radiation at the wavelength of its maximum excitation but rather with the entire continuum of exciter radiation in the wavelength range between 145 nm and 185 nm. Q*$_{Xe}$ stands for the approximate quantum efficiency (it is influenced by how the fluorescent material is prepared and has not been optimized, so that the values given should be understood as lower limits).

DRAWINGS

Figure 2:
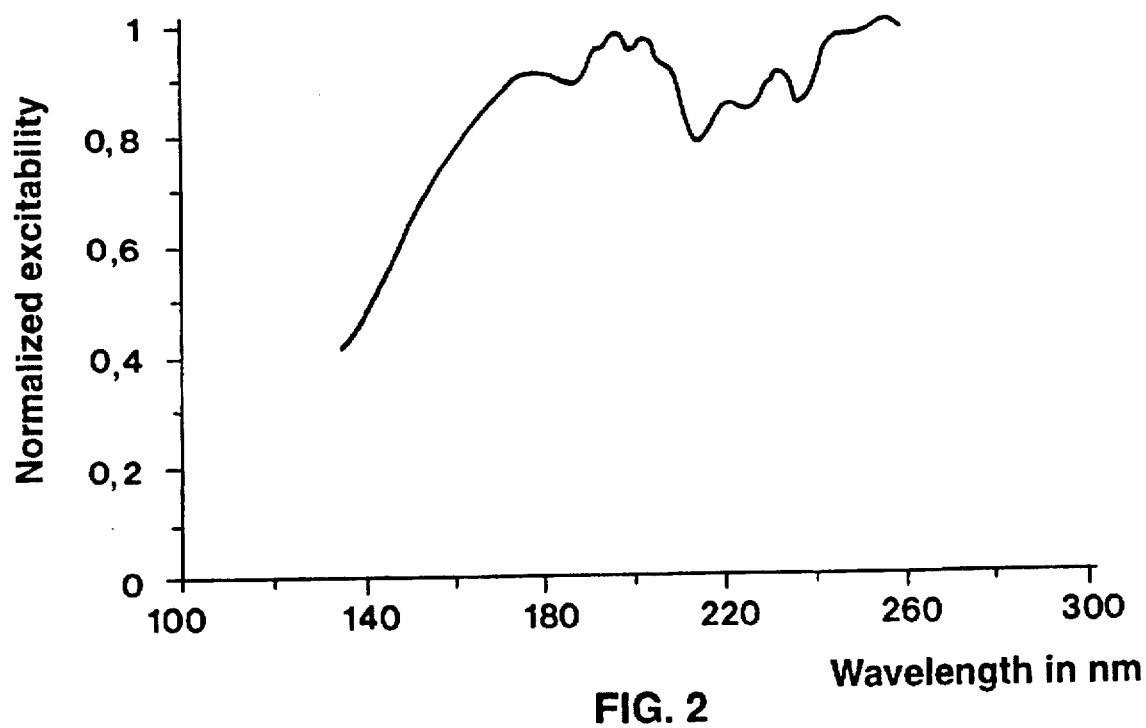
Figure 3:
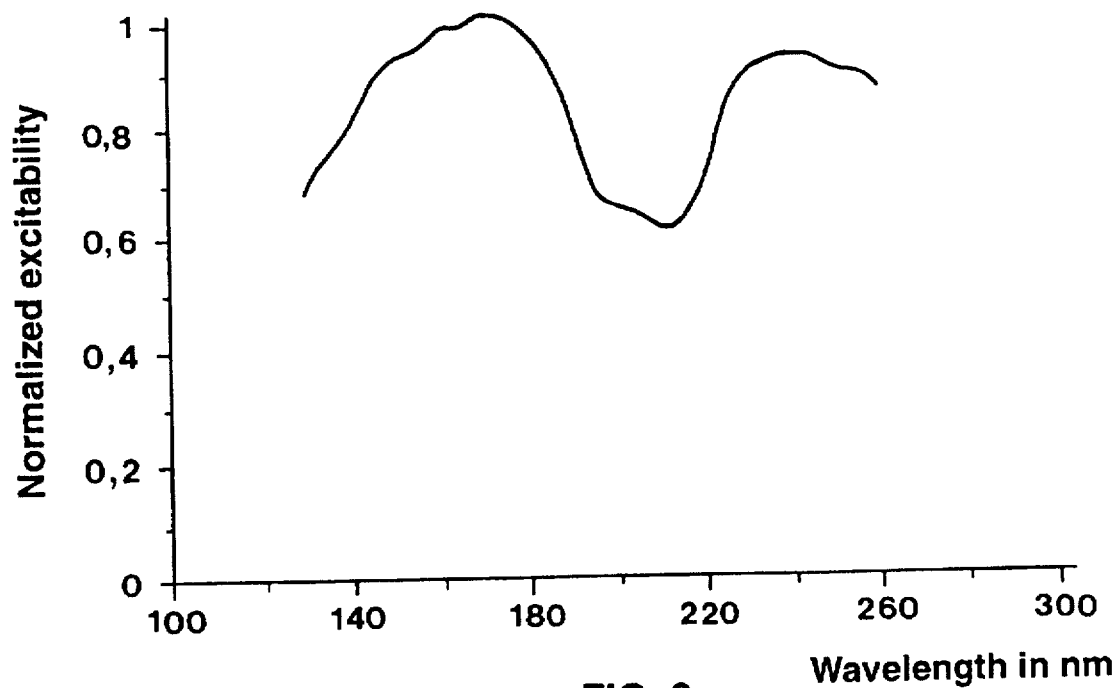
Figure 4:
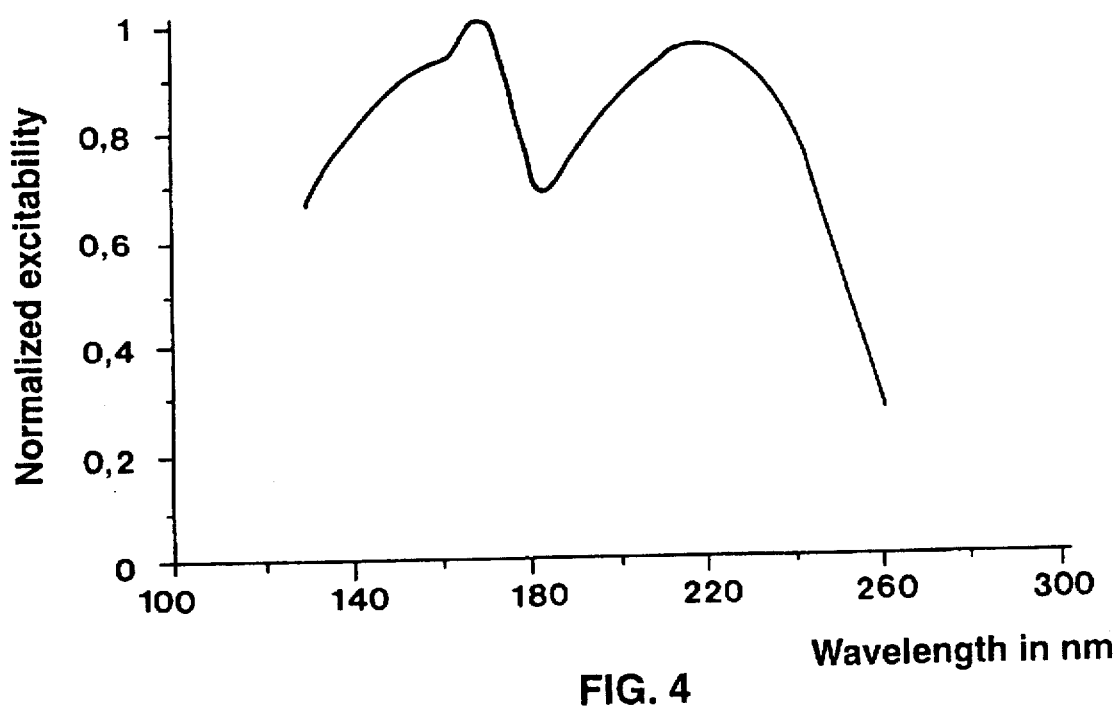
Figure 5:
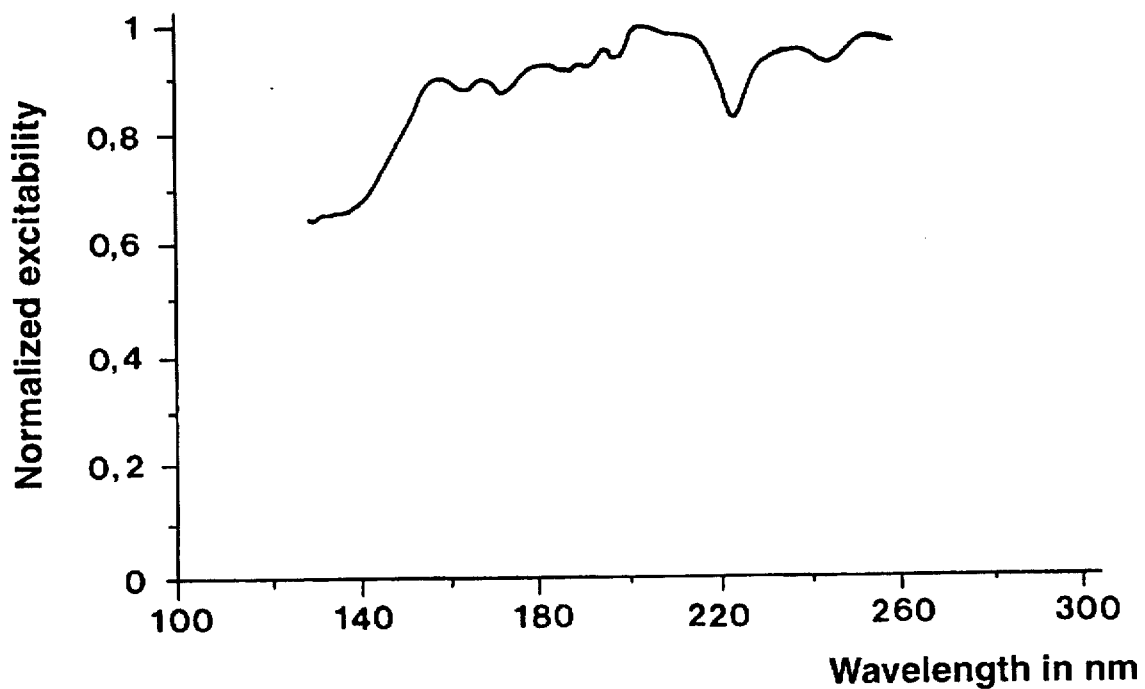
Figure 6A:
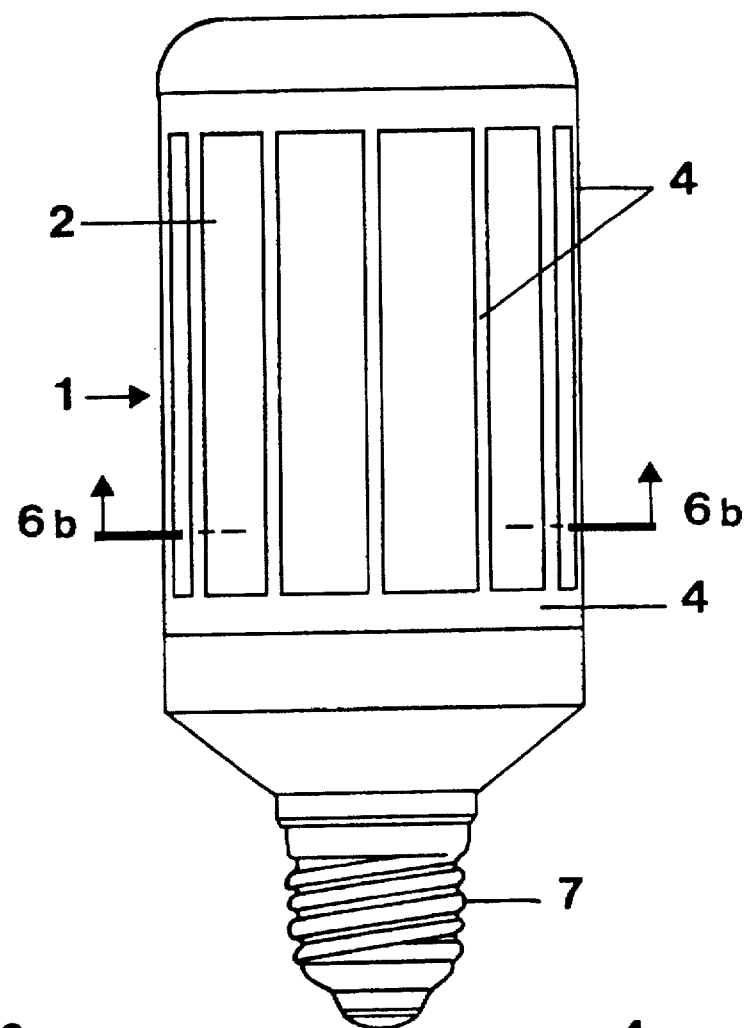
Figure 6B:
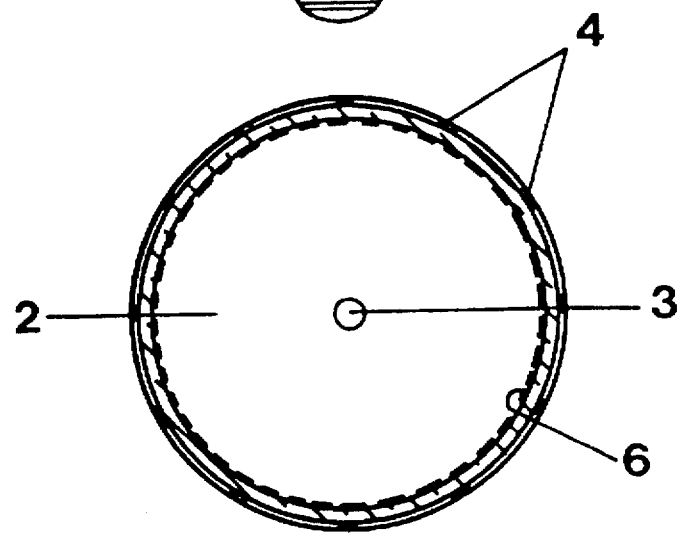
Figure 7:
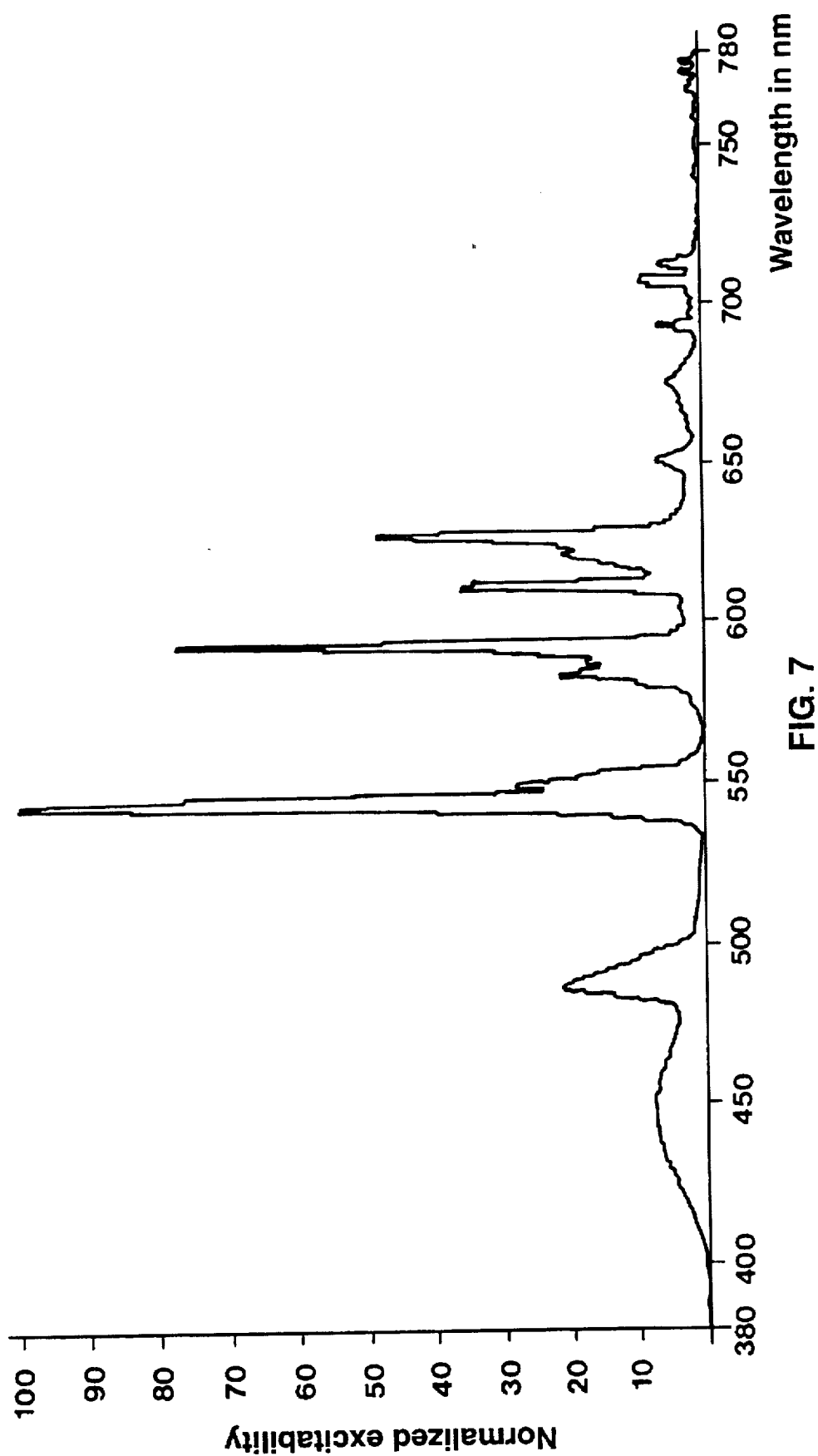

The figures show,

FIG. 1, the VUV excitation spectrum of the red fluorescent material Y$_2$O$_3$:Eu$^{3+}$;

FIG. 2, the VUV excitation spectrum of the green fluorescent material CeMgAl$_{11}$O$_{19}$:Tb$^{3+}$;

FIG. 3, the VUV excitation spectrum of the blue fluorescent material BaMgAl$_{10}$O$_{17}$:Eu$^{2+}$;

FIG. 4, the VUV excitation spectrum of the red fluorescent material (Y$_{0.72}$Gd$_{0.2}$Eu$_{0.08}$)BO$_3$;

FIG. 5, the VUV excitation spectrum of the green fluorescent material (La$_{0.43}$Ce$_{0.39}$Tb$_{0.18}$)PO$_4$;

FIG. 6a, the side view of a novel fluorescent lamp with a three-band fluorescent material coating according to the invention;

FIG. 6b, the cross section taken along the line VIb—VIb of the fluorescent lamp shown in FIG. 6a;

FIG. 7, the emission spectrum of the three-band fluorescent lamp of FIGS. 6a, b.

EXAMPLE 1

The first exemplary embodiment describes red fluorescent materials with highly suitable emission spectra. They are each rare earth mixed borates activated with trivalent Europium. The following table shows fluorescent materials of various compositions; the first composition contains both yttrium Y and gadolinium Gd, while the next two each contain only yttrium or only gadolinium. In FIG. 4, the excitation spectrum of fluorescent material number 1 is shown.

| No. | Composition | E$_{Xe}$ | Q*$_{Xe}$ |
|---|---|---|---|
| 1 | (Y$_{0.72}$Gd$_{0.2}$Eu$_{0.08}$)BO$_3$ | 0.89 | 0.69 |
| 2 | (Y$_{0.92}$Eu$_{0.08}$)BO$_3$ | 0.86 | 0.57 |
| 3 | (Gd$_{0.92}$Eu$_{0.08}$)BO$_3$ | 0.84 | 0.57 |

EXAMPLE 2

The second exemplary embodiment describes green fluorescent materials with very highly suitable emission spectra. These are rare earth mixed phosphates activated with trivalent terbium. The following table shown fluorescent materials of various compositions, some of which are additionally doped with trivalent cerium or scandium as coactivators. The first four fluorescent materials contain lanthanum La. In the next four fluorescent materials, the lanthanum has been replaced with yttrium Y, and scandium Sc has also been added to fluorescent material number 8. In the last three fluorescent materials, the lanthanum has been replaced with gadolinium Gd, and once again scandium Sc has been added to the last fluorescent material. FIG. 5 shows the excitation spectrum for the fluorescent material La$_{0.44}$Ce$_{0.43}$Tb$_{0.13}$)PO$_4$.

| No. | Composition | E$_{Xe}$ | Q*$_{Xe}$ |
|---|---|---|---|
| 1 | (La$_{0.43}$Ce$_{0.39}$Tb$_{0.18}$)PO$_4$ | 0.89 | 0.80 |
| 2 | (La$_{0.57}$Ce$_{0.29}$Tb$_{0.14}$)PO$_4$ | 0.88 | 0.78 |
| 3 | (La$_{0.65}$Ce$_{0.20}$Tb$_{0.15}$)PO$_4$ | 0.87 | 0.76 |
| 4 | (La$_{0.828}$Tb$_{0.172}$)PO$_4$ | 0.86 | 0.74 |
| 5 | (Y$_{0.434}$Ce$_{0.394}$Tb$_{0.172}$)PO$_4$ | 0.89 | 0.75 |
| 6 | (Y$_{0.65}$Ce$_{0.2}$Tb$_{0.15}$)PO$_4$ | 0.91 | 0.72 |
| 7 | (Y$_{0.828}$Tb$_{0.172}$)PO$_4$ | 0.82 | 0.65 |
| 8 | (Y$_{0.818}$Sc$_{0.01}$Tb$_{0.172}$)PO$_4$ | 0.89 | 0.73 |
| 9 | (Gd$_{0.434}$Ce$_{0.394}$Tb$_{0.172}$)PO$_4$ | 0.89 | 0.82 |
| 10 | (Gd$_{0.828}$Tb$_{0.172}$)PO$_4$ | 0.84 | 0.71 |
| 11 | (Gd$_{0.821}$Sc$_{0.0067}$Tb$_{0.172}$)PO$_4$ | 0.89 | 0.8 |

EXAMPLE 3

The third exemplary embodiment again describes green fluorescent materials with very highly suitable emission spectra. As the following table shows, this group includes two yttrium borates activated with trivalent terbium, and number 2 additionally contains gadolinium.

| No. | Composition | E$_{Xe}$ | Q*$_{Xe}$ |
|---|---|---|---|
| 1 | (Y$_{0.9}$Tb$_{0.1}$)BO$_3$ | 0.84 | 0.62 |
| 2 | (Y$_{0.7}$Gd$_{0.2}$Tb$_{0.1}$)BO$_3$ | 0.86 | 0.65 |

EXAMPLE 4

The fourth exemplary embodiment describes a further green fluorescent material. This is a rare earth mixed silicate activated with trivalent terbium and containing yttrium and scandium, in accordance with the formula (Y$_{0.924}$Sc$_{0.002}$Tb$_{0.074}$)$_2$SiO$_5$. The following values were found: E$_{Xe}$=0.94, Q*$_{Xe}$=0.8.

EXAMPLE 5

The fifth exemplary embodiment describes two further green fluorescent materials. These are rare earth mixed aluminates activated with trivalent terbium. The first fluorescent material is an yttrium aluminate of the following composition: $(Y_{0.9}Tb_{0.1})_3Al_5O_{12}$. The following values were ascertained: $E_{xe}=0.94$, $Q^*_{xe}=0.76$. In the second fluorescent material—which is of equal value in its properties—gadolinium is substituted for 20% of the yttrium: $(Y_{0.7}Gd_{0.2}Tb_{0.1})_3Al_5O_{12}$.

EXAMPLE 6

The sixth exemplary embodiment describes a blue fluorescent material. This is a mixed aluminate activated with divalent europium, in accordance with the formula $(Ba_{0.94}Eu_{0.06})MgAl_{10}O_{17}$. The following values were found: $E_{xe}=0.96$, $Q^*_{xe}=0.86$.

EXAMPLE 7

FIG. 6a shows the side view and FIG. 6b the cross section of a fluorescent lamp 1 that is especially suitable for lighting purposes. The circular-cylindrical discharge vessel 2 comprises DURAN® glass (made by Schott) that is 0.7 mm thick, and the vessel has a diameter of about 50 mm and is filled with xenon at a pressure of 173 hPa. Centrally axially inside the discharge vessel 2, there is an inner electrode 3 in the form of a special steel bar of circular cross section and with a diameter of 2 mm. On the outer wall of the discharge vessel 2, 12 conducting silver strips each 1 mm wide and 8 mm long, are disposed as outer electrodes 4 axially parallel and uniformly distributed. The inner wall of the discharge vessel 2 is coated with a fluorescent material layer 6 which can be protected by a cover layer of, for example, $MgF_2$. This is a three-band fluorescent material mixture having the blue component B: $(Ba_{0.94}Eu_{0.06})MgAl_{10}O_{17}$, the green component G: $(La_{0.43}Ce_{0.39}Tb_{0.18})PO_4$, and the red component R: $(Y_{0.72}Gd_{0.2}Eu_{0.08})BO_3$. The components are mixed in the ratio B:G:R=0.85:0.555:0.36. A pulsed periodic voltage, which with respect to the outer electrode amounts to approximately 4 kV, with a mean pulse length of approximately 1.2 μs and a pulse frequency of approximately 25 kHz, is applied to the inner electrode 3 by means of an Edison base 7. A light yield of 40 lm/W is thus attained. The color temperature is 4000 K, and the color site, in accordance with the color standard table according to CIE, has the coordinates x=0.38 and y=0.377. The emission spectrum of this lamp is shown in FIG. 6.

We claim:

1. In combination with a source of vacuum ultraviolet (VUV) broad band molecular excited radiation of wavelengths shorter than 200 nm, which radiation is generated by $Xe_2^*$ excimer radiation, fluorescent materials for illumination purposes excitable by said VUV molecular excited $Xe_2^*$ excimer radiation, comprising a host lattice and at least one dopant substance, wherein the dopant substance contains at least one activator and luminesces in the visible range of the optical spectrum, wherein, for efficient excitation by said $Xe_2^*$ excimer radiation, the fluorescent material comprises a mixed borate in accordance with the general formula $$(Y_xGd_yEu_z)BO_3,$$

where the following relations apply: $0 \leq x \leq 0.99$, $0 \leq y \leq 0.99$, $0.01 \leq z \leq 0.2$, and x, y and z are in the ranges of $0.55 \leq x \leq 0.87$, $0.1 \leq y \leq 0.3$ and $0.03 \leq z \leq 0.15$, and $x+y+z \approx 1$.

2. In combination with a source of vacuum ultraviolet (VUV) broad band molecular excited radiation of wavelengths shorter than 200 nm, which radiation is generated by $Xe_2^*$ excimer radiation, fluorescent materials for illumination purposes excitable by said VUV molecular excited $Xe_2^*$ excimer radiation, comprising a host lattice and at least one dopant substance, wherein the dopant substance contains at least one activator and luminesces in the visible range of the optical spectrum, wherein, for efficient excitation by said $Xe_2^*$ excimer radiation, the dopant substances additionally contain a coactivator;

the activator includes $Eu^{2+}$; and the fluorescent material includes a mixed aluminate in accordance with the general formula $$(Ba_xEu_y)MgAl_{10}O_{17}$$

where the following relations apply: $0.6 \leq x \leq 0.97$, $0.03 \leq y \leq 0.4$, and $x+y \approx 1$.

3. The combination of claim 2, characterized in that x and y are in the ranges of $0.8 \leq x \leq 0.95$, $0.05 \leq y \leq 0.2$ and $x+y \approx 1$.

4. In combination with a source of vacuum ultraviolet (VUV) broad band molecular excited radiation of wavelengths shorter than 200 nm, which radiation is generated by $Xe_2^*$ excimer radiation, fluorescent materials for illumination purposes excitable by said VUV molecular excited $Xe_2^*$ excimer radiation, comprising a host lattice and at least one dopant substance, wherein the dopant substance contains at least one activator and luminesces in the visible range of the optical spectrum, wherein, for efficient excitation by said $Xe_2^*$ excimer radiation, the activator includes $Tb^{3+}$; and the fluorescent material includes a mixed aluminate in accordance with the general formula $$(Y_xGd_yTb_z)_3Al_5O_{12}$$

where the following relations apply: $0.1 \leq x \leq 0.99$, $0 \leq y \leq 0.9$, $0.01 \leq z \leq 0.4$, and $x+y+z \approx 1$.

5. The combination of claim 4, characterized in that y=0 and x, z are in the ranges $0.8 \leq x \leq 0.99$, $0.01 \leq z \leq 0.2$, and $x+z \approx 1$.

6. In combination with a source of vacuum ultraviolet (VUV) broad band molecular excited radiation of wavelengths shorter than 200 nm, which radiation is generated by $Xe_2^*$ excimer radiation, fluorescent materials for illumination purposes excitable by said VUV molecular excited $Xe_2^*$ excimer radiation, comprising a host lattice and at least one dopant substance, wherein the dopant substance contains at least one activator and luminesces in the visible range of the optical spectrum, wherein, for efficient excitation by said $Xe_2^*$ excimer radiation, the activator includes $Tb^{3+}$; and the fluorescent material includes a mixed silicate in accordance with the general formula $$(Y_xSc_yTb_z)_3SiO_5$$

where the following relations apply: $0.6 \leq x \leq 0.99$, $0 \leq y \leq 0.1 \leq z \leq 0.4$, and $x+y+z \approx 1$.

7. In combination with a source of vacuum ultraviolet (VUV) broad band molecular excited radiation of wavelengths shorter than 200 nm, which radiation is generated by $Xe_2^*$ excimer radiation, fluorescent materials for illumination purposes excitable by said VUV molecular excited $Xe_2^*$ excimer radiation, comprising a host lattice and at least one dopant substance, wherein the dopant substance contains at least one activator and luminesces in the visible range of the optical spectrum, wherein, for efficient excitation by said $Xe_2^*$ excimer radiation, the fluorescent material includes a mixed borate in accordance with the general formula $(Y_xGd_yTb_z)BO_3$ where the following relations apply: $0.1 \leq x \leq 0.99$, $0 \leq y \leq 0.99$, $0.01 \leq z \leq 0.4$, and $x+y+z \approx 1$; and x, y and z are in the ranges of $0.55 \leq x \leq 0.8$, $0.1 \leq y \leq 0.3$, and $0.03 \leq z \leq 0.2$, and $x+y+z \approx 1$.

8. In combination with a source of vacuum ultraviolet (VUV) broad band molecular excited radiation of wavelengths shorter than 200 nm, which radiation is generated by $Xe_2^*$ excimer radiation, fluorescent materials for illumination purposes excitable by said VUV molecular excited $Xe_2^*$ excimer radiation, comprising a host lattice and at least one dopant substance, wherein the dopant substance contains at least one activator and luminesces in the visible range of the optical spectrum, wherein, for efficient excitation by said $Xe_2^*$ excimer radiation, the fluorescent material includes a mixed phosphate in accordance with the general formula $(Ln_xCe_ySc_wTb_z)PO_4$ where Ln is one of the elements La, Y or Gd or a mixture of these elements, and where the following relations apply: $0.35 \leq x \leq 0.95$, $0 \leq y \leq 0.5$, $0 \leq w \leq 0.2$, $0.05 \leq z \leq 0.5$, and $w+x+y+z \approx 1$.

9. The combination of claim 8, characterized in that w=0 and x, y and z are in the rages of $0.45 \leq x \leq 0.8$, $0.1 \leq y \leq 0.3$, $0.1 \leq z \leq 0.25$, and $x+y+z \approx 1$.

10. In combination with a source of vacuum ultraviolet (VUV) broad band molecular excited radiation of wavelengths shorter than 200 nm, which radiation is generated by $Xe_2^*$ excimer radiation, fluorescent materials for illumination purposes excitable by said VUV molecular-excited $Xe_2^*$ excimer radiation, comprising a host lattice and at least one dopant substance, wherein the dopant substance contains at least one activator and luminesces in the visible range of the optical spectrum, wherein, for efficient excitation by said $Xe_2^*$ excimer radiation, the fluorescent material includes a red fluorescent material R of a mixed borate in accordance with the general formula $(Y_xGd_yEu_z)BO_3$, where the following relations apply: $0 \leq x \leq 0.99$, $0 \leq y \leq 0.99$, $0.01 \leq z \leq 0.2$, and $x+y+z \approx 1$;

a green fluorescent material G of a mixed phosphate in accordance with the general formula $(Ln_xCe_ySc_wTb_z)PO_4$ where Ln is one of the elements La, Y or Gd or a mixture of these elements, and where the following relations apply: $0.35 \leq x \leq 0.95$, $0 \leq y \leq 0.5$, $0 \leq w \leq 0.2$, $0.05 \leq z \leq 0.5$, and $w+x+y+z \approx 1$;

and a blue fluorescent material B of a mixed aluminate in accordance with the general formula $(Ba_xEu_y)MgAl_{10}O_{17}$ where the following relations apply: $0.6 \leq x \leq 0.97$, $0.03 \leq y \leq 0.4$, and $x+y+z \approx 1$; and wherein the proportions by weight in the mixture are: $0.21R<0.5$, $0.4<G<0.7$, $0.05<B<0.15$, and $R+G+B=1$.

11. The combination of claim 10, wherein the source of said VUV radiation comprises a fluorescent lamp having a lamp vessel (2) and a coating (6) of at least one of said fluorescent materials on a wall surface of the lamp vessel (2).

12. The combination of claim 11 comprising a protective layer on the surface of the fluorescent materials or of the fluorescent material coating.

13. The combination of claim 12, characterized in that the protective layer comprises $MgF_2$.

* * * * *